(12) United States Patent
Makins et al.

(10) Patent No.: US 8,365,383 B2
(45) Date of Patent: Feb. 5, 2013

(54) MOLD TWIST LOCK APPARATUS

(75) Inventors: James D. Makins, Greer, SC (US); Marvin G. Owen, Williamston, SC (US)

(73) Assignees: Compagnie Generale des Etablissments Michelin (FR); Societe de Technologie Michelin (CH)

( * ) Notice: Subject to any disclaimer, the term of this patent is extended or adjusted under 35 U.S.C. 154(b) by 88 days.

(21) Appl. No.: 13/128,174

(22) PCT Filed: Dec. 5, 2008

(86) PCT No.: PCT/US2008/013478
§ 371 (c)(1),
(2), (4) Date: May 6, 2011

(87) PCT Pub. No.: WO2010/065025
PCT Pub. Date: Jun. 10, 2010

(65) Prior Publication Data
US 2011/0217408 A1    Sep. 8, 2011

(51) Int. Cl.
*B29C 33/30* (2006.01)
(52) U.S. Cl. .......... 29/426.1; 29/525.01; 29/525.08; 425/46; 425/195
(58) Field of Classification Search .......... 425/28.1, 425/46, 193, 195; 29/426.1, 428, 525.01, 29/525.03, 525.08
See application file for complete search history.

(56) References Cited

U.S. PATENT DOCUMENTS

| 2,352,414 | A | 6/1944 | Spooner |
| 3,085,462 | A | 4/1963 | Myers |
| 3,599,452 | A | 8/1971 | Maruyama et al. |
| 3,787,155 | A * | 1/1974 | Zangl .............................. 425/46 |
| 3,810,703 | A | 5/1974 | Pasbrig |
| 3,989,294 | A | 11/1976 | Carr |
| 4,648,153 | A | 3/1987 | Coroneos |
| 4,809,402 | A | 3/1989 | Rainville |
| 6,061,874 | A | 5/2000 | Tatara |
| 6,292,993 | B1 * | 9/2001 | Ito et al. ......................... 425/46 |
| 6,336,765 | B1 | 1/2002 | Watanabe |
| 6,386,789 | B1 | 5/2002 | Chausse et al. |
| 2008/0095879 | A1 | 4/2008 | Tu |

OTHER PUBLICATIONS

International Search Report and Written Opinion for PCT/US2008/013478 with filing date of Dec. 5, 2008; dated Feb. 12, 2009.

* cited by examiner

*Primary Examiner* — James Mackey
(74) *Attorney, Agent, or Firm* — E. Martin Remick

(57) ABSTRACT

A mold twist lock apparatus comprising a securing pin having a distal end and a proximal end on a longitudinal axis of the securing pin, the proximal end having a hole therethrough, a coaxial spring positioned about the proximal end of the securing pin, a cross pin disposed through the hold in the proximal end of the securing pin, the cross pin having an enlarged end and a second spring positioned between an extension of the securing pin and the enlarged end of the cross pin.

12 Claims, 3 Drawing Sheets

MOLD TWIST LOCK APPARATUS

BACKGROUND OF THE INVENTION

1. Field of the Invention

This invention relates generally to molds and more specifically to positioning and locking mold components.

2. Description of the Related Art

In the construction of pneumatic tires, various uncured tire components are assembled together sequentially around a tire building drum and shaped around the drum into the desired toroidal form of the tire. The shaped uncured tire is then cured for strength and durability. Tire molds are used in the curing process to give a tire its final shape and appearance and to vulcanize the components of the tire.

Segmented tire molds are a plurality of sector shaped segments that move radially as depicted in FIG. 1. Heated exterior components of the mold are moved into contact with the tread and sidewall portions of the uncured tire and cure the tire from the outside. A heated bladder is inflated or a core contacts the inner surface of the tire to shape and cure the tire from the inside.

A mold back is a wedge shaped component used to support the mold sectors that form the tread portions of the tire as shown in FIG. 1. Sector tooling provides the connection between the mold back and the mold sector. The purpose of the sector tooling is to position the mold sectors circumferentially around the mold. For safety and quality reasons, it is important to ensure that the mold components are secured within the mold.

SUMMARY OF THE INVENTION

Embodiments of the present invention provide an improved quick connecting lock to attach the mold sectors to the mold back. An embodiment creates a quick connection that locks mold sectors in place and allows for tire size and tread pattern changes with minimal down time.

A mold twist lock apparatus comprises a securing pin having a distal end and a proximal end on a longitudinal axis of the securing pin, the proximal end having a hole therethrough, a coaxial spring positioned about the proximal end of the securing pin, a cross pin disposed through the hole in the proximal end of the securing pin, the cross pin having an enlarged end and a second spring positioned between an extension of the securing pin and the enlarged end of the cross pin.

A mold assembly comprises a first mold component having a plurality of protrusions with holes therethrough, a second mold component having a plurality of protrusions with holes therethrough, an interlocking column formed by combining the plurality of protrusions of the first mold component and the second mold component, a securing pin having a distal end and a proximal end on a longitudinal axis of the securing pin, the proximal end having a hole therethrough, a coaxial spring positioned about the proximal end of the securing pin, a cross pin disposed through the hole in the proximal end of the securing pin, the cross pin having an enlarged end, a second spring positioned between an extension of the securing pin and the enlarged end of the cross pin and a recess for receiving the enlarged end of the cross pin.

The foregoing and other objects, features and advantages of the invention will be apparent from the following more detailed descriptions of particular embodiments of the invention, as illustrated in the accompanying drawing wherein like reference numbers represent like parts of the invention.

DETAILED DESCRIPTION OF PARTICULAR EMBODIMENTS

Particular embodiments of the present invention include an apparatus for attaching and locking mold components. The invention may be used with any type of molding, such as, injection molding, compression molding, or other such molding where there is a need to have mold components attached and locked together.

Particular embodiments of the present invention may be used in tire molds. Segmented tire molds contain mold sectors that produce the tread portion of the tire. Mold sectors are attached to the mold back to position and secure the mold sectors during vulcanization. Mold sectors are typically heavy metal objects that require secure attachments. It is advantageous to use an attaching mechanism that is simple to use and easy to maneuver. The attaching mechanism should also provide a secure locking means. Embodiments of the present invention provide both an attaching mechanism and a locking means for securing mold components.

Figure 1:
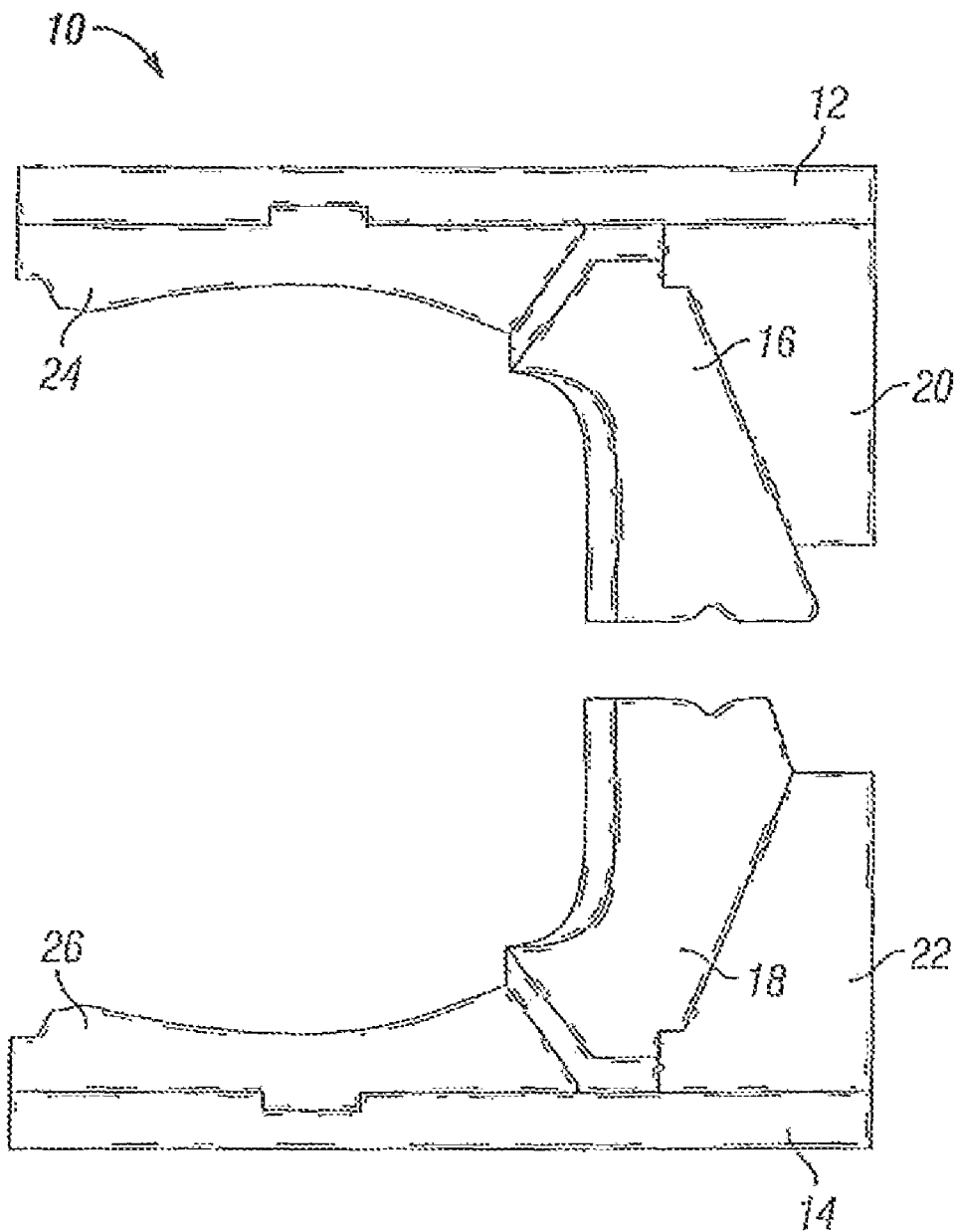
FIG. 1 is a partial section view of a two piece segmented mold according to the prior art.
Figure 3:
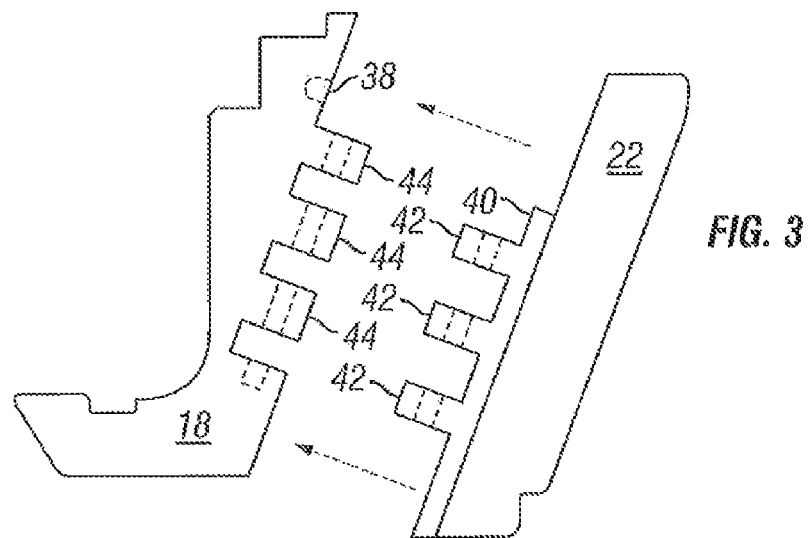
FIG. 3 is a partial cross-section view of a mold in the open position in accordance with the invention.

FIG. 1 illustrates a partial section view of a two piece segmented tire mold 10. The tire mold 10 includes an upper base plate 12 and a lower base plate 14. The upper base plate includes a top mold back 20 that forms a ring to support the other mold elements, a top side plate 24 that molds the side wall of the tire, and a plurality of tread mold sectors 16 movably mounted to the top mold back 20. The lower base plate 14 similarly includes a mold back 22, a bottom side plate 26, and a plurality of mold sectors 18. The mold sectors 18 are mounted to the mold back 22 with a set of mold tooling such as sector tooling 40 as shown in FIG. 3. The base plates 12, 14 hold the sectors 16, 18 and the mold backs 20, 22 and the side plates 24, 26 together within the mold.

Figure 4:
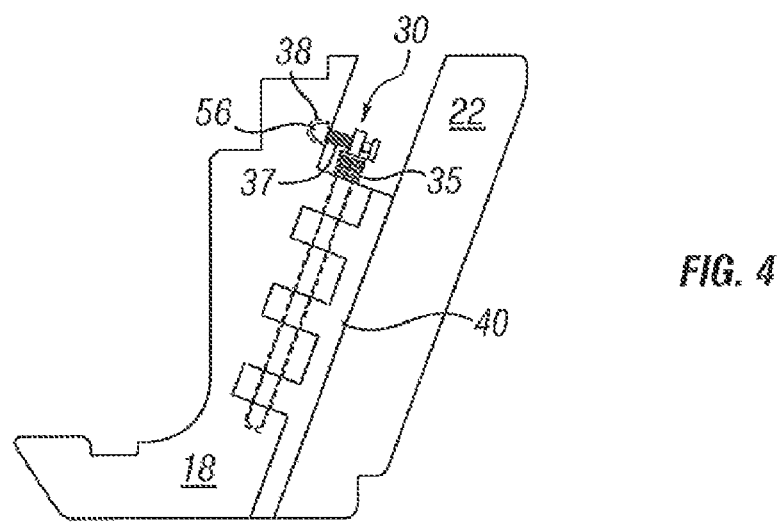
FIG. 4 is a partial cross-section view of a mold in the closed position in accordance with the invention.

FIGS. 3 and 4 schematically illustrate a section of the bottom half of the tire mold 10. While these figures illustrate the bottom half of the mold, the invention as described herein is equally adaptable to the top half of the mold. In this particular embodiment the mold back is the first mold component and the mold sector is the second mold component. A mold sector 18 is attached to the mold back 22 using sector tooling 40. The sector tooling 40 functions to hold the mold sector 18 to the mold back 22 during the curing operation. The sector tooling may be attached to the mold back using grooves, clamps, bolts, screws or any other means known in the art.

FIG. 3 illustrates the connection between the mold sector 18 and the mold back 22 using the sector tooling 40 which is attached to the mold back 22. The sector tooling comprises a plurality of tooling steps 42 or protrusions arranged vertically along the length of the sector tooling. Each tooling step 42 has a hole therethrough forming an open column from the top of the sector tooling through the bottom of the sector tooling.

The mold sector 18 also comprises a plurality of sector steps 44 or protrusions arranged similarly to the tooling steps. A plurality of sector steps 44 may be machined into the mold sector or attached through other known manners, such as, clamps, bolts, etc. In the illustrative example shown herein, the sector steps and tooling steps both have an 8 mm diameter hole. The securing pin 32 has a diameter of about 0.05-0.10 mm less than the diameter of the hole.

During assembly of the mold the sector 18 and the mold back 22 are brought into a radial alignment such that the tooling steps 42 and sector steps 44 form an interlocking column as illustrated in FIG. 4. The interlocking steps are a plurality of tooling steps 42 with holes therethrough and a plurality of sector steps 44 also with holes therethrough. A pin shaped member such as securing pin 32 is there after inserted through the column of holes to secure together the sector 18 and the mold back 22. The dimensions of the holes and securing pin 32 are not critical to the alignment of the mold sectors 18. The mold sectors align at the lateral edges of the sectors.

Figure 2:
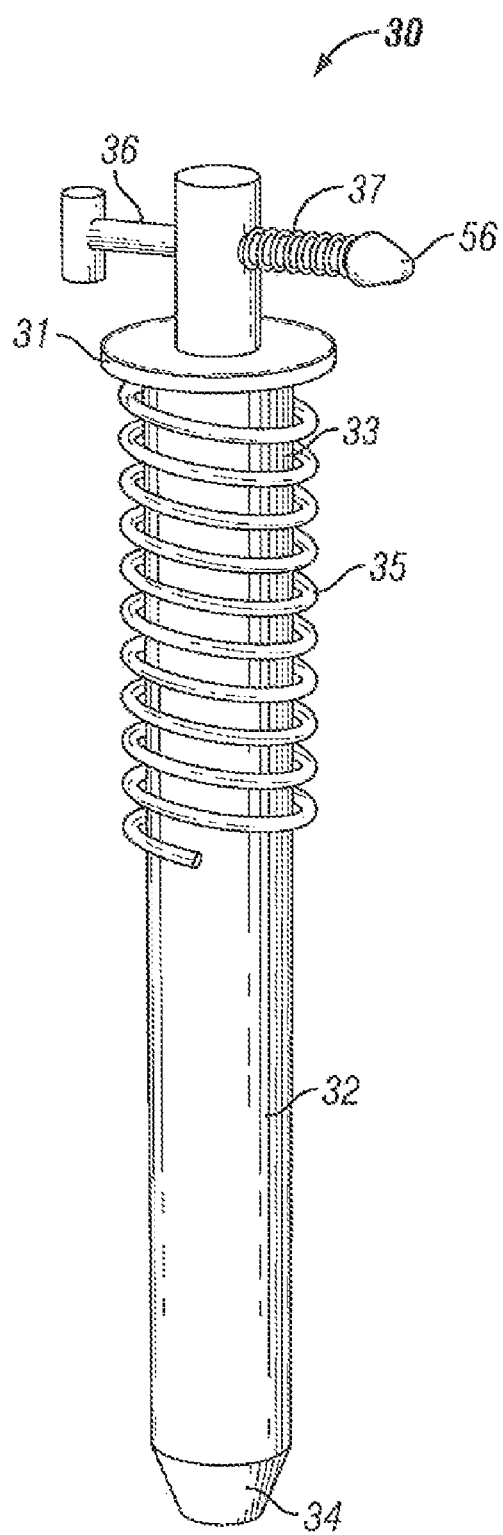
FIG. 2 is a front elevation view of the mold twist lock apparatus in accordance with the invention.

FIG. 2 illustrates an embodiment of the mold twist lock apparatus 30. The mold twist lock apparatus comprises a securing pin, a coaxial spring, a cross pin and a second spring. The securing pin 32 may be cylindrical in shape, having a proximal end 33 and a distal end 34. The securing pin 32 may have variable lengths and cross-section size and shapes dependent on the size of the mold components to be attached.

The securing pin 32 utilizes a coaxial spring 35 at the proximal end 33 of the securing pin 32. The coaxial spring 35 is a compression spring to provide tension when the mold components are locked. A particular embodiment of the present invention utilizes a coil spring as the coaxial spring. The proximal end of the securing pin 32 includes an enlarged section or shoulder 31 to retain the spring. The other end of the spring bears on an upper surface of the first of the tooling steps 42 on the mold back 22.

The proximal end 33 of securing pin 32 further comprises an extension having a hole therethrough. A cross pin 36 is inserted in the hole in the extension in the securing pin 32. In the embodiment shown in FIG. 2 the cross pin is located perpendicular to the axis of the securing pin 32. The cross pin may also be located at an angle relative to the securing pin. The cross pin 36 has an enlarged end 56 for providing engagement with the mold tooling. A particular embodiment of the enlarged end of the cross pin 36 is cone shaped. The enlarged end 56 of the cross pin may be various shapes including triangular, circular, or square.

The cross pin 36 may utilize a second spring 37. The second spring is located on the cross pin between the extension in the proximal end of the securing pin and the enlarged end 56 of the cross pin. In the illustrative example, the cross pin 36 has a stroke length of about 4 mm. As shown in FIG. 4, the mold sector 18 comprises a recess 38 for receiving the enlarged end 56 of the cross pin 36. The second spring 37 when compressed maintains engagement of the enlarged end 56 of the cross pin 36 within the recess 38 of the mold. Alternatively, the recess 38 may be located on the mold back 22 or the sector tooling 40 as a matter of design convenience.

The mold assembly comprises a first mold component, a second mold component, an interlocking column, a securing pin, a coaxial spring, a cross pin, a second spring and a recess. In this particular embodiment the mold back 22 is the first mold component and the mold sector 18 is the second mold component.

FIG. 4 illustrates schematically the assembled mold half. The interlocking column is a plurality of tooling steps 42 with holes therethrough and a plurality of sector steps 44 with holes therethrough. The mold sector 18 and the mold back 22 are in mutual alignment so that tooling steps 42 and sector steps 44 alternately stack together creating a column of interlocking steps where the holes in the steps are approximately coaxial.

The interlocking column 46 and securing pin 32 create a quick connection between the sector tooling 40 and the mold sector 18. This quick connection provides for easy changing of tread patterns by simply replacing the existing mold sectors with the new tread pattern mold sectors. A particular advantage is that the sectors may be exchanged without removing the mold from the curing press.

In the embodiment shown in FIG. 4, the sector 18 includes a recess 38 for receiving the enlarged end of the cross pin 36. The cross pin 36 includes a second spring 37 to create a biasing force to maintain the enlarged end 56 of the cross pin in the recess 38 of the mold sector. To assemble the mold sector 18 to the sector tooling 40, the securing pin 32 is inserted into the holes in the interlocking column. The securing pin 32 slides downward until the coaxial spring 35 contacts a first tooling step 42. At this point, cross pin 36 will still be in a vertical alignment above the level of the recess 38. Pressure is then applied to the proximal end 33 of the securing pin 32 to compress the coaxial spring 35 until the cross pin 36 is in alignment with the recess 38. The cross pin 36 may then be inserted into the recess 38 and maintained in place by the urging force of the second spring 37.

Figure 5:
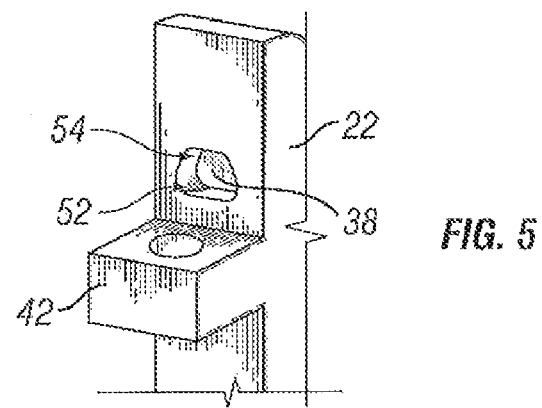
FIG. 5 is an exploded front elevation view of the recess.

In a particular embodiment, the recess 38 is a polygon with a wide region 52 and a narrow region 54 as shown in FIG. 5. The narrow region 54 is located towards the center line of the tire mold 10, i.e. at the uppermost end of sector 18. The width of the narrow region 54 is sized so that when the cross pin 36 is withdrawn to its maximum extent, the cross pin cannot be removed from the recess 38. To remove the cross pin 36 from the recess 38 two steps must be completed. The coaxial spring 35 on the securing pin 32 biases the enlarged end 56 of the cross pin 36 into the narrow region 54 of the recess 38 by creating a force against the sector tooling 40. The coaxial spring 35 must first be compressed to move the enlarged end 56 of the cross pin from the narrow region of the recess to the wide region 52 of the recess. Then the second spring 37 must be compressed to remove the enlarged end of the cross pin from the recess. Finally, the cross pin 36 must be rotated out of the recess 38 while the securing pin remains in the compressed position. Both springs must fail for the pin to be unintentionally removed from the recess. Another feature of the present invention is the ease in detecting a locking failure. A failure to secure the mold twist lock apparatus is obviously apparent because the ejected securing pin can be visually detected as it stands taller than the mold sector. The coaxial spring raises the securing pin to a level above the mold sector when not compressed.

The dimensions of the recess are important in restricting the movement of the enlarged end of the cross pin. The narrow region length restricts the lateral movement of the cross pin preventing disengagement from the recess. A particular embodiment of the present invention has a recess with a narrow region length of about 2.5 mm to about 3.5 mm and a wide region length of about 4.0 mm to about 5.0 mm and an overall height of the recess of about 10.5 mm to about 11.5 min and the depth of the recess is between about 4.5 mm and 5.5 mm. The illustrative example shown in FIG. 5 has a recess with a narrow region length of about 3.0 mm and a wide region length of about 4.5 mm and an overall height of the recess of about 11.0 mm. The depth of the recess is about 5 mm. The recess is oriented with the narrow region at the top or interior part of the mold near the parting line of the mold.

One skilled in the art will recognize that many dimensional combinations may be selected for the above geometry.

A particular embodiment of the cross pin 36 is shown in FIG. 2 where the enlarged end is cone shaped with a radius at the vertex of the cone. The cone has an included angle of about 70 degrees and the vertex has a radius of 2 mm. The cone shape is preferred to other shapes, such as spherical or flat end. The edge of the recess 38 makes approximately a right angle with the surface of the sector 18 or tooling. When the angled flank of the cone shaped end 56 contacts the edge of the recess, a force is automatically created to urge the securing pin 32 so that the cross pin 36 engages the recess 38. This effect is advantageous to ease insertion of the pin. A further benefit could be obtained by adding a small chamfer to the edges of the recess 38 to amplify the urging effect.

The terms "comprising," "including," and "having," as used in the claims and specification herein, shall be considered as indicating an open group that may include other elements not specified. The term "consisting essentially of," as used in the claims and specification herein, shall be considered as indicating a partially open group that may include other elements not specified, so long as those other elements do not materially alter the basic and novel characteristics of the claimed invention. The terms "a," "an," and the singular forms of words shall be taken to include the plural form of the same words, such that the terms mean that one or more of something is provided. The terms "at least one" and "one or more" are used interchangeably. The term "one" or "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (not required) feature of the invention. Ranges that are described as being "between a and b" are inclusive of the values for "a" and "b."

It should be understood from the foregoing description that various modifications and changes may be made to the embodiments of the present invention without departing from its true spirit. The foregoing description is provided for the purpose of illustration only and should not be construed in a limiting sense. Only the language of the following claims should limit the scope of this invention.

What is claimed is:

1. A mold assembly comprising:
   a first mold component having a plurality of protrusions with holes therethrough;
   a second mold component having a plurality of protrusions with holes therethrough;
   an interlocking column formed by combining the plurality of protrusions of the first mold component and the second mold component;
   a securing pin having a distal end and a proximal end on a longitudinal axis of the securing pin, the proximal end having a hole therethrough, wherein the securing pin is thereafter inserted through the interlocking column to secure the first mold component and the second mold component;
   a coaxial spring positioned about the proximal end of the securing pin;
   a cross pin disposed through the hole in the proximal end of the securing pin, the cross pin having an enlarged end;
   a second spring positioned between an extension of the securing pin and the enlarged end of the cross pin; and
   a recess in one of the mold components for receiving the enlarged end of the cross pin.

2. The mold assembly of claim 1, wherein the recess is located on the second mold component, and the enlarged end of the cross pin is engaged within the recess.

3. The mold assembly of claim 1, wherein the recess is in the shape of a polygon, wherein the polygon has a wide bottom region, a narrow top region, a height between the top and bottom region and a depth.

4. The mold assembly of claim 3, wherein the wide region of the polygon has a width between 4 to 5 mm, the narrow region has a width between 2.5 to 3.5 mm, the height of between 10.5 to 11.5 mm and the depth of between 4.5 to 5.5 mm.

5. The mold assembly of claim 1, wherein the first mold component is a mold sector.

6. The mold assembly of claim 5, wherein the recess is located on the mold sector.

7. The mold assembly of claim 1, wherein the cross pin is disposed essentially perpendicularly to the securing pin.

8. The mold assembly of claim 1, wherein the enlarged end of the cross pin is in the shape of a cone having a radius at a vertex of the cone.

9. The mold assembly of claim 8, wherein the cone has an included angle of about 70 degrees and the vertex has a radius of about 2 mm.

10. A method of assembling a mold comprising the steps of:
    providing a first mold component having a plurality of protrusions with holes therethrough, and a second mold component having a plurality of protrusions with holes therethrough;
    positioning the first mold component relative to the second mold component such that the pluralities of protrusions form an interlocking column;
    inserting a securing pin in the holes of the interlocking column, the securing pin having a distal end and a proximal end on a longitudinal axis of the securing pin, the proximal end having a hole therethrough, a coaxial spring positioned about the proximal end of the securing pin, a cross pin disposed through the hole in the proximal end of the securing pin, the cross pin having an enlarged end, a second spring positioned between an extension of the securing pin and the enlarged end of the cross pin;
    compressing the coaxial spring until the cross pin is in alignment with a recess in one of the mold components for receiving the enlarged end of the cross pin; and
    inserting the enlarged end of the cross pin into the recess.

11. The method of claim 10, further comprising the steps of compressing the second spring to locate the enlarged end of the cross pin proximate to a wide region of the recess;
    rotating the enlarged end into the recess;
    releasing the compression force on the second spring; and
    releasing the compression of the coaxial spring to move the enlarged end of the cross pin into a narrow region of the recess.

12. A method of disassembling a mold comprising the steps of:
    providing a mold assembly comprising
       a first mold component having a plurality of protrusions with holes therethrough,
       a second mold component having a plurality of protrusions with holes therethrough,
       an interlocking column formed by combining the plurality of protrusions of the first mold component and the second mold component,
       a recess in one of the mold components having a narrow region and a wide region, a securing pin having a distal end and a proximal end on a longitudinal axis of the securing pin, the proximal end having a hole therethrough, wherein the securing pin is inserted through the interlocking column to secure the first mold component and the second mold component, a coaxial spring positioned about the proximal end of the securing pin;

a cross pin disposed through the hole in the proximal end of the securing pin, the cross pin having an enlarged end, a second spring positioned between an extension of the securing pin and the enlarged end of the cross pin, and wherein the enlarged end of the cross pin is inserted into the narrow region of the recess;

compressing the coaxial spring on the securing pin to move the enlarged end of the cross pin from the narrow region of the recess into the wide region of the recess;

compressing the second spring on the cross pin;

rotating the enlarged end of the cross pin out of the recess; and withdrawing the securing pin from the interlocking column.

* * * * *